United States Patent [19]
Weckenmann et al.

[11] Patent Number: 4,953,306
[45] Date of Patent: Sep. 4, 1990

[54] FLEXIBLE CNC-MULTIPOSITION MEASURING INSTALLATION

[75] Inventors: Albert Weckenmann, Ahrensburg; Hans-Jurgen Mordhorst, Glinde, both of Fed. Rep. of Germany

[73] Assignee: Mauser-Werke Oberndorf GmbH, Oberndorf, Fed. Rep. of Germany

[21] Appl. No.: 183,828

[22] Filed: Apr. 20, 1988

[30] Foreign Application Priority Data

May 5, 1987 [DE] Fed. Rep. of Germany ....... 3714862

[51] Int. Cl.$^5$ ................................................ G01B 5/20
[52] U.S. Cl. ...................................... 33/503; 33/1 M; 33/552; 33/557
[58] Field of Search ................ 33/1 M, 503, 504, 548, 33/551, 552, 557, 560

[56] References Cited

U.S. PATENT DOCUMENTS

| | | | |
|---|---|---|---|
| 3,499,227 | 3/1970 | Krause et al. | 33/552 |
| 3,594,909 | 7/1971 | Schultz | 33/504 |
| 3,750,295 | 8/1973 | Nordmann et al. | 33/548 |
| 4,483,079 | 11/1984 | Band et al. | 33/503 |
| 4,631,834 | 12/1986 | Hayashi | 33/503 |

FOREIGN PATENT DOCUMENTS

| | | | |
|---|---|---|---|
| 0160047 | 9/1983 | Japan | 33/557 |
| 447626 | 3/1968 | Switzerland | 33/1 M |
| 2189604 | 10/1987 | United Kingdom | 33/503 |

Primary Examiner—William A. Cuchlinski, Jr.
Assistant Examiner—Patrick R. Scanlon
Attorney, Agent, or Firm—Scully, Scott, Murphy & Presser

[57] ABSTRACT

A flexible CNC-multiposition measuring installation, which represents a combination of components from the coordinate measuring technique with elements from the multiposition measuring technique and the counter testing technique, which are joinable with each other in a common measuring installation. Such CNC-multiposition measuring installation are, in particular, adapted for the integration thereof into a manufacturing or production process.

10 Claims, 8 Drawing Sheets

FLEXIBLE CNC-MULTIPOSITION MEASURING INSTALLATION

BACKGROUND OF THE INVENTION

1. Field of the Invention

The present invention relates to a flexible CNC-multiposition measuring installation, which represents a combination of components from the coordinate measuring technique with elements from the multiposition measuring technique and the contour testing technique, which are joinable with each other in a common measuring installation. Such CNC-multiposition measuring installations are, in particular, adapted for the integration thereof into a manufacturing or production process.

Increasing demands are constantly placed on the manufacturing or production measuring technology, which result from the utilization of new production methods and flexible production systems, the changed production structures and production sequences, and the extensive automation through the employment of new information technologies. Moreover, there must also be considered the constructive demands on the micro and macro configuration of workpieces. Belonging to the most important task of the manufacturing measuring technique is the determination of the geometric features of workpieces (the investigation of the contour of the workpiece). Within this province, evermore criteria are always decisive to the applicability of production measuring apparatuses for certain measuring tasks.

2. Discussion of the Prior Art

The locations for the utilization of production measuring apparatuses within a manufacturing or production plant extend themselves to the receipt of the goods, to production islands for the preparation of corrective values for processing or manufacturing machines for the purpose of regulating the production process, quality control, assembly and the final control of the ultimate product. In all of these provinces, contour-testing measuring media come presently into use. The keypoint of the manufacturing measuring technique in the production process, which for a lengthy period of time resided within the experiment or testing chamber in the absolutely accurate and extremely universally geometric ultimate testing of workpieces under expedient conditions, is frequently displaced directly into, the province or area of manufacturing. There, under manufacturing conditions, with regard to the measuring time, the number and training of the measuring personnel and the conditions of the surroundings, must there be made possible accuracies comparable to those obtained in a testing chamber, as a result of which there must be assumed a restriction in flexibility.

In order to be able to realize these demands, there is afforded the possibility, on the one hand, to exploit the further development of conventional manufacturing or production measuring apparatuses with the extensive retention of the fundamental properties in the measuring techniques of these apparatuses or, on the other hand, to carry out the development of a new type of manufacturing measuring apparatus which inherently combines the advantageous components of conventional manufacturing measuring apparatuses.

SUMMARY OF THE INVENTION

Commencing from the known state-of-the-technology and the demands which are placed on the future manufacturing measuring technology it is an object of the present invention to provide a flexible CNC-multiposition measuring installation, which for the always increasing variants in product at a smaller number of pieces and with increasing demands on quality, allows for an assured continual production, in addition to facilitating a rapid measuring with a low uncertainty in measurement, and affords the solution of a multiplicity of measuring tasks; for example, such as linear measurement, surface measurement and contour testing.

The foregoing and other objects are more clearly elucidated in the following detailed description of preferred embodiments of the invention.

Thus, the inventive features afford the advantage that, through the combination of components from the coordinate measuring technique with elements of the multiposition measuring technique and the contour testing technique, there is implemented a linkage of these seemingly contrary appearing measuring philosophies in a single apparatus, and thereby it is possible to close the current gap in the measurement technology existent between the coordinate measuring technique as a flexible method for the universal overall testing of all measuring tasks which are set for suitable workpieces, and the multiposition measuring technique as a dependable method for the rapid feedback of selected and manufacturing-relevant features of the workpieces.

This synthesis ensures a high degree of precision in measurement for absolute measurements, as well as a high speed and accurate repeatability in the testing of certain features in configuration. The starting point for the conception of this manufacturing or production measuring system, on the one hand, can be formed from the basic principle of the coordinated measuring technique and, on the other hand, from the basic principle of the known multiposition measuring technique. In a stable basic apparatus construction which is known from the coordinate measuring technique, with a plurality of independent measuring arrangements or also modules, there are integrated elements from the multiposition measuring technique; for instance with regard to drawing or layout data on a multiple scanner which is preset on a master piece and automated calipers. The determination of the measured value and the evaluation of the measurement can be implemented through suitable expansion of measuring software assumed from the coordinate measuring technique in the way of the usual coordinate measuring technique, as well as pursuant to the method of the multiposition measuring technique by means of a direct reference-actual comparison at certain measuring scanning locations. This signifies that the measuring scanner, commencing from the plotted pre-given data, can be preset or calibrated on a selected workpiece. The resultingly fixedly preset measuring scanners will then for all subsequent workpieces travel at a high speed towards the measuring points and repeatably provide the measurement data in a reference-actual comparison.

The essential properties and special features of this new multiposition measuring installation are the five mutually independent measuring devices which are essentially constituted of a bridge with a vertical spindle sleeve and four horizontal extension arms each having a horizontal spindle sleeve. Thereby, each axis of displacement is equipped with its own linear measuring system for an increase in the precision and a compensating device for the inertial forces, which are encountered during acceleration. In this installation, the workpiece can be measured simultaneously from five different sides, without necessitating complicated scanning combinations for this purpose. Furthermore, combined circular and planar measurements are simultaneously possible in five different lines of measurement, and for contour testing on shafts, the bridge spindle can be employed as a head brace. The multiposition measuring installation can be produced with the usually required measuring range; for instance, 1000 mm×1000 mm×1200 mm. The mutually independent measuring devices are modular, whereby under the term three-axes measuring units this can be understood to mean complete structural units.

Through the continual collision control, there is precluded any mutual obstructing hindrance in the travel of the spindle sleeves. A structural group which is designed as a coordinate measuring apparatus can be employed as a flexible setting master for the remaining structural units applied in multiposition measuring technique, as a result of which there is eliminated the embodiment of a setting master. There can be carried out a common calibration of all measuring devices on a centrally arranged test member with an encompassing or all-inclusive measurement. Furthermore, it is possible to provide for a common reference point determination; namely, the zero point of the reference coordinate system, through the measurement on a centrally applied lowerable ball-normal or taper.

Through the utilization of a plurality of mutually independent measuring systems, it is possible to attain a higher rate of measuring points at a simultaneous workpiece scanning from five different directions. The measuring installation can be assembled from standardized modules and be correlated with the current requirements with only small requirements, in view of which there is achieved a flexibility with respect to the arrangement and size of the measuring axes. Through the modular construction, there is also obtained a relatively rapid repair capability through a simple exchange of the modules. Through the employment of a plurality of measuring devices; for example, for the contour, position and roughness testing in the different measuring arms, the entire system can be utilized in combination with a turntable in a quasi-mode as a rotary-cycle measuring installation.

In summation, the main features of the inventive multiposition measuring installation can be set forth as follows:
   high flexibility in the configuration; flexibility of a selected configuration limited to a family of workpiece parts;
   a multi-faceted possibility of combinations between applications in the coordinate and multiposition measuring techniques;
   elimination of a setting master for calibration at applications of the multiposition-measuring technique;
   a complete automization of collective apparatus functions;
   modular construction through the use of standardized structural components;
   complete integration into the production flow;
   information-technique linkage in a CD/CAM/CAQ data juncture;
   high degree dependability and short measuring time periods, as well as rapid feedback of quality data into the production;
   production-oriented test results for controlling the quality within the production island; good repeatability;
   high absolute precision in the applications of the co-ordinate measuring technique;
   application of suitable scanning systems; and extensive range of measurement of about 1000 mm×1000 mm×1200 mm.

BRIEF DESCRIPTION OF THE DRAWINGS

Reference may now be had to the following detailed description of exemplary embodiments of the invention, taken in conjunction with the accompanying drawings; in which.

DETAILED DESCRIPTION

Figure 1:
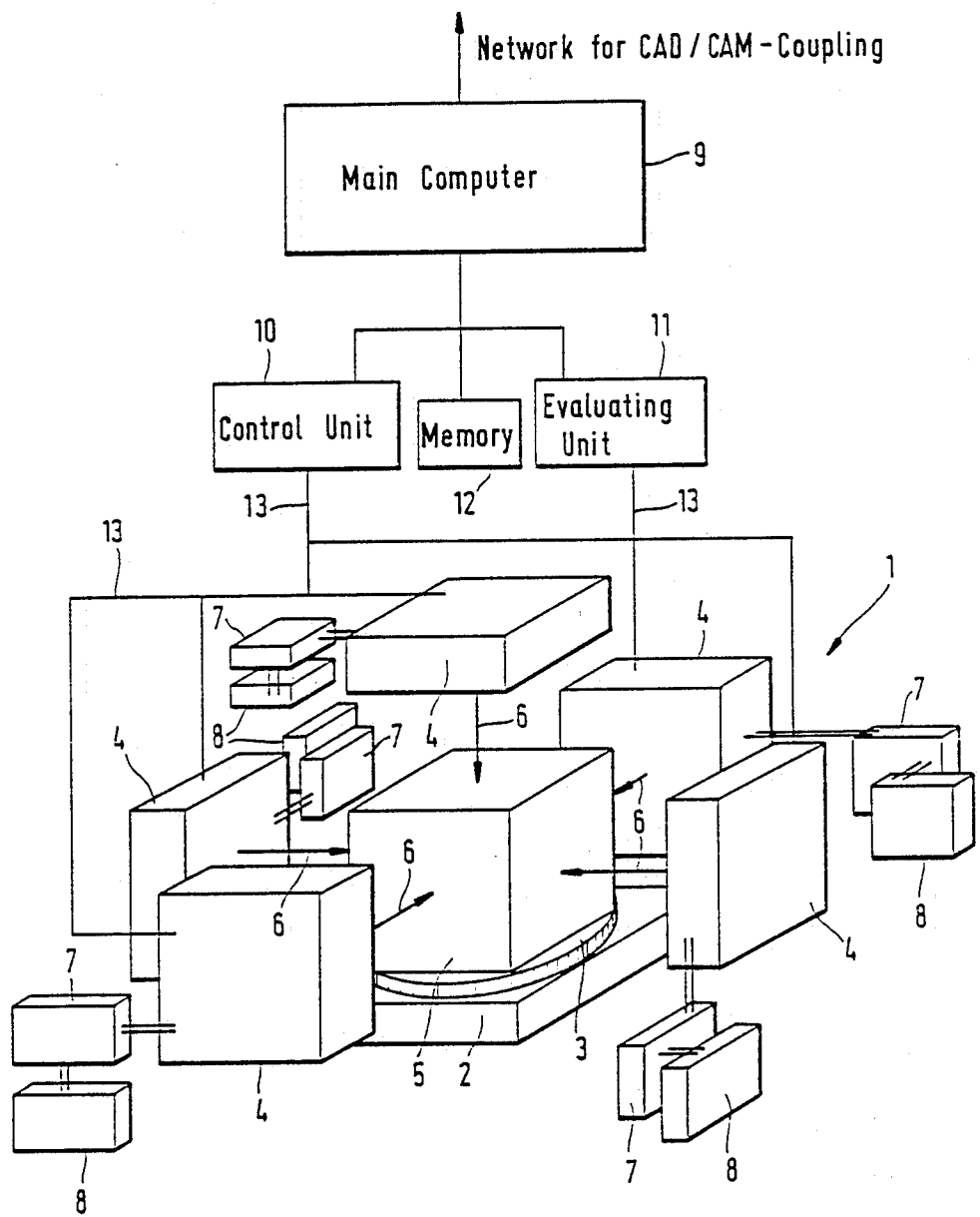
FIG. 1 illustrates a multiposition measuring installation, as represented in a circuit block diagram.

The multiposition measuring installation 1, pursuant to the primary arrangement shown in FIG. 1, is constituted of a centrally-located measuring table or platform 2 which, in the illustrated exemplary embodiment, receives an integrated turntable or switching plate 3, and the measuring devices 4 which are arranged about the central measuring table 2 from five sides thereof. The measuring devices, in a suitable selection, can represent components from the coordinate measuring technique, as well as elements from the multiposition measuring technique and the contour testing technique. The measuring devices 4, which operate independently of each other are arranged towards the sides as well as above the centrally positioned workpiece 5, and possess simple measuring scanners or sensors 6 which are directed towards the workpiece 5.

Through the combination with the integrated turntable 3 there can be effected a distribution of the existent measuring tasks among different measuring devices 4 which are specialized for certain measuring tasks and are arranged towards the sides of the workpiece. These measuring devices can consist in the installation for the determination of the position of the workpiece, the device for positional testing, the device for contour testing and the device for measuring surface roughness. The measuring devices 4 are equipped with changing devices 7 for the measuring scanners or sensors 6 and for the measurement heads for all measuring axes. Attached to these changing devices 7 are magazines 8 for the preparation of the measuring sensors and measurement heads. Associated with this multiposition measuring arrangement 1 is an apparatus lead or main computer 9, which is constructed from a control unit 10, an evaluating unit 11 and a storage or memory 12. The measuring devices are electrically interconnected with the apparatus lead computer through suitable electrical lines 13.

Figure 2:
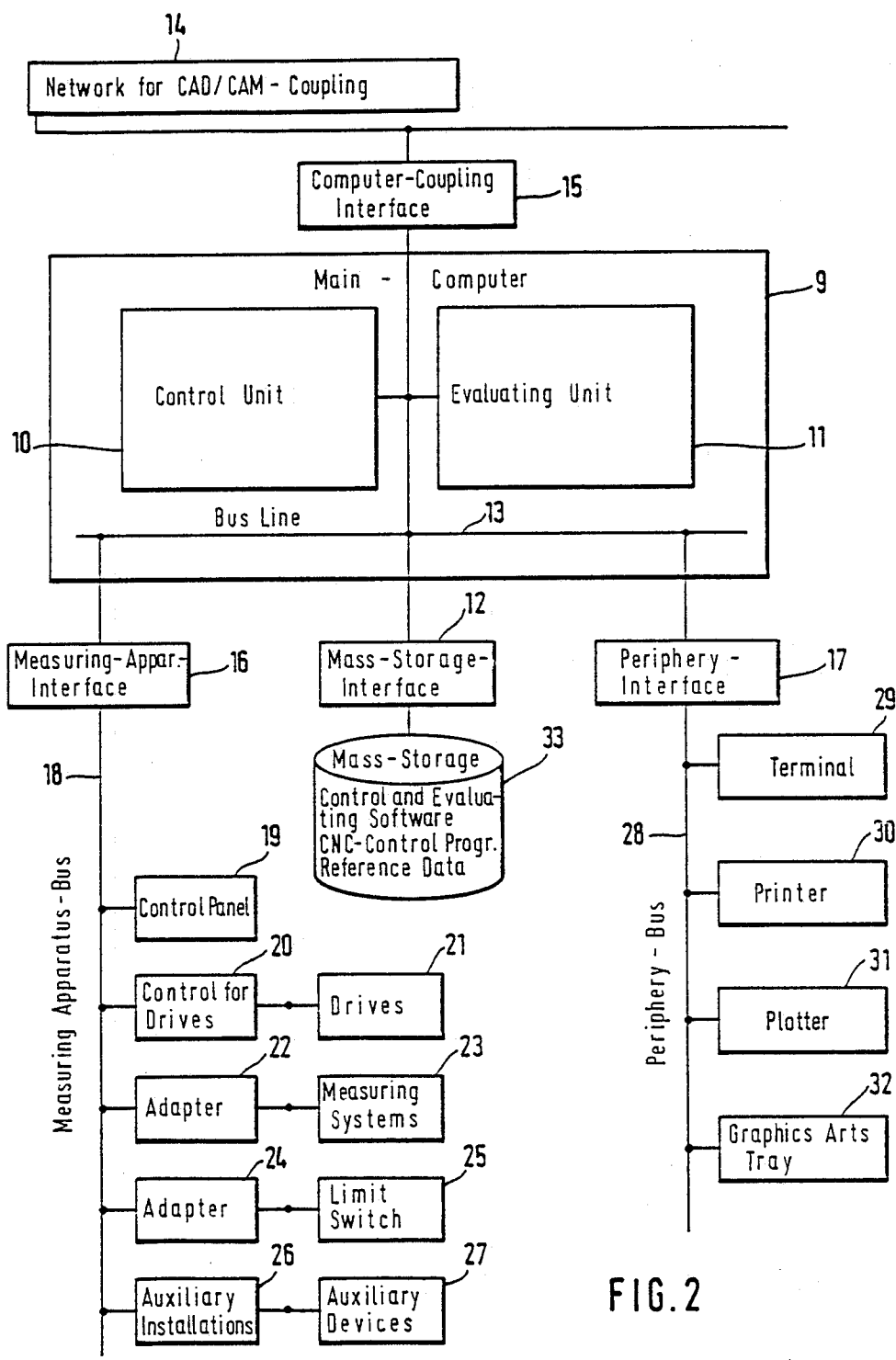
FIG. 2 illustrates a circuit block diagram of the hardware components for the CNC-multiposition measuring installation.

As is indicated particularly in FIG. 2 of the drawings, the apparatus lead computer 9 together with the integrated control unit 10 and the evaluating unit 11, as well as the mass storage 12, are connected to a network 14 for CAD/CAM coupling through an applicable computer-coupling interface 15. Moreover, the apparatus lead computer 9 is connected through bus lines 13 with the measuring apparatus-interface 16 as well as with the periphery-interface 17. The measuring apparatus bus line 18 connects the control panel 19 to the measuring apparatus-interface 16, the control for drives 20 with the drives 21, the adapter 22 for the measuring systems 23, the adapter 24 for the limit switch 25, as well as the control for auxiliary installations 26 with the auxiliary devices 27. A periphery-bus line 28 can connect a terminal 29, a printer 30, a plotter 31, and a graphics arts tray 32 with the periphery-interface 17. The mass storage-interface 12 provides the connection to the actual mass storage 33 for the control and evaluating software, for the CNC-control program and for the reference data.

Figure 3:
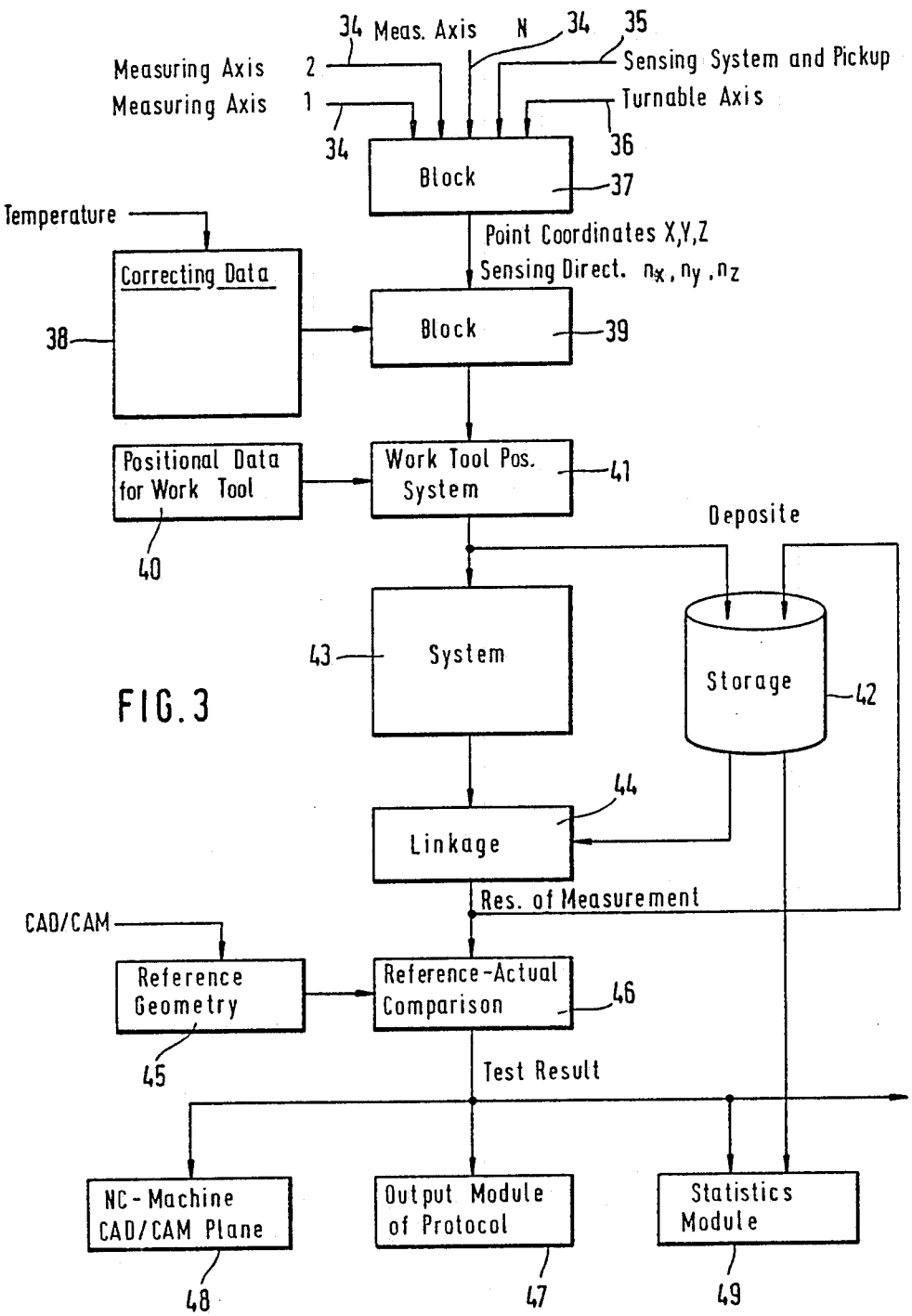
FIG. 3 illustrates a flow plan for the evaluation of measuring points with the evaluating software of the multiposition measuring installation.

From FIG. 3 there can be ascertained the flow diagram which is essentially known from the coordinate measuring technique for the evaluation of measuring points with the evaluating software therefore. The measuring axis 4, the scanning or sensing system and the pickup 36 as well as the turntable axis 36 are assembled, fitted and superimposed in the block 37. The obtained point coordinates X, Y and Z as well as the corresponding sensing directions for X, Y and Z are conducted further and corrected in the block 39 on the basis of temperature correcting data 38. After the concurrent determination of the positional data for the work tool, the thusly corrected coordinates and scanning or sensing directions are transformed in the work tool position system 41. The point coordinates, results of measurement and trend data are deposited in a parallel storage 42, while the transformed point coordinates and sensing directions are additional conducted, in parallel with the computation of compensating form elements and the measuring uncertainty, into the system 43. Subsequently, there is effected the junction or linkage with the output of the result of measurement, which is deposited in the storage 42. Through the input of the reference geometry from the CAD/CAM system, there is effectuated the reference-actual comparison 46, whose test results are then further conducted to the output module 47 of the protocol, to the NC-machine and the CAD/CAM plane 48, as well as to the statistics module 49. The statistics module has additionally introduced therein the trend data from the storage 42.

Figure 4:
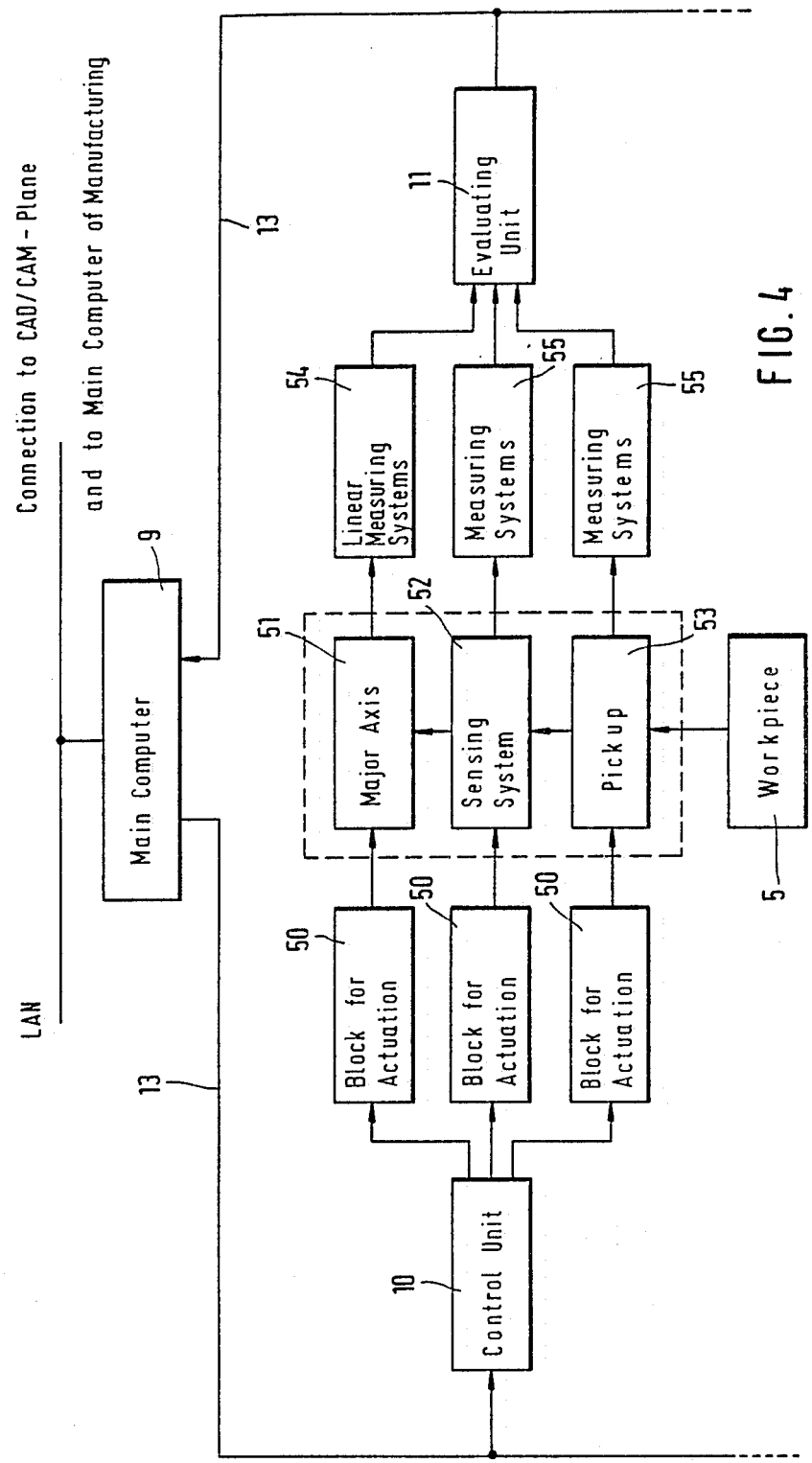
FIG. 4 illustrates a circuit block diagram of an extension arm or bridge structural group of the multiposition measuring installation.
Figure 6:
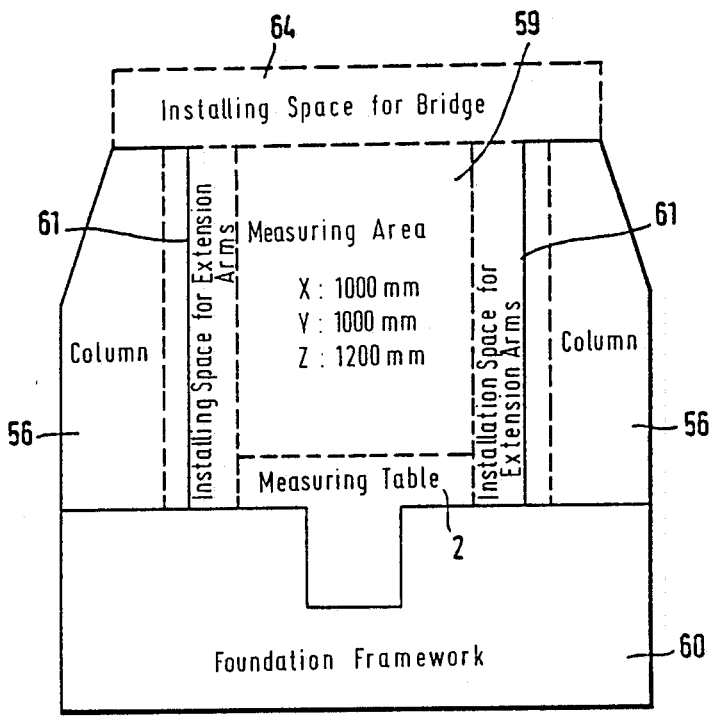
FIG. 6 illustrates the base frame pursuant to FIG. 5 in a schematic front view.
Figure 5:
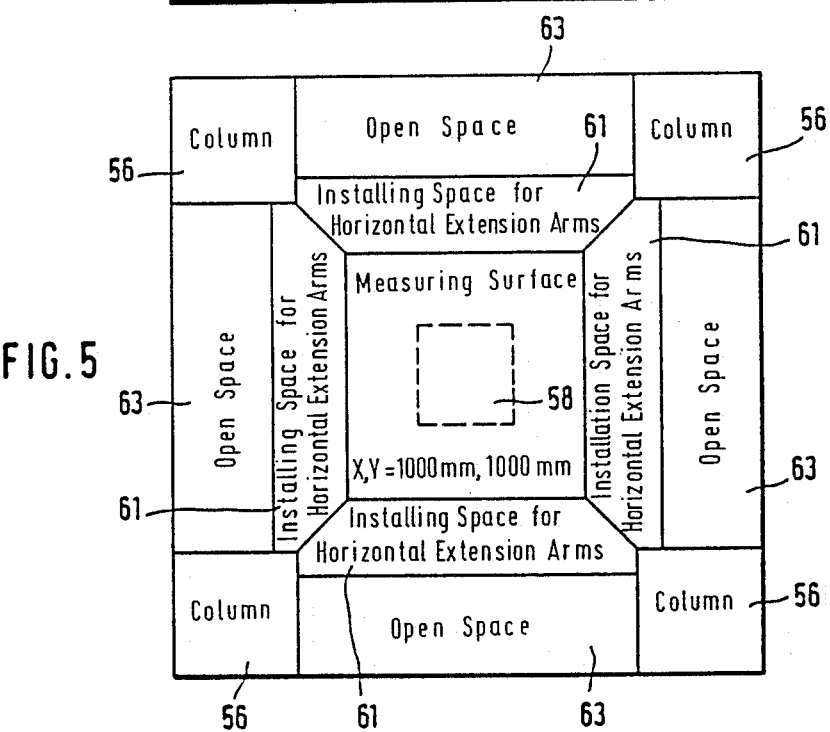
FIG. 5 illustrates a base frame for the multiposition measuring installation with installing spaces for the measuring apparatuses, shown in a schematic top plan view.

The circuit block diagram pursuant to FIG. 4 illustrates the extension arm and bridge structural group in the connection to the apparatus lead computer 9. From the control unit 10, through the blocks 50, there is at one time undertaken the actuation of the major axes 51, the scanning or sensing systems 52 and the pickup 53. Hereby, the pickups 53 stand in an operative connection with the workpiece 5. The obtained values from the major axes are transmitted through a linear measuring system 54 to the evaluating unit 11, while corresponding measuring systems 55 similarly conduct the obtained values from the sensing system and from the pickup to the evaluating unit 11. The evaluated results are again made available from the evaluating unit 11 through the line 13 to the apparatus lead computer 9 and processed in the latter. Employable as a linear measuring system would be laser interferometers or also optical linear measuring systems. The linear measuring devices may comprise incremental measuring systems and selectively capacitive measuring rods.

The construction of the measuring apparatuses of the multiposition measuring installation 1 can be undertaken in a simple constructional mode, such that four columns 56 are arranged in a rectangle at uniform distances from each other. Arranged centrally between the four columns 56 is the measuring table 57 with the measuring surface 58 and the measuring area 59. Reference numeral 60 identifies the foundation framework. Presently provided at the four sides of the measuring table 21 is an installing space 61 for horizontal extension arms 62, whereas a further open space 3 is presently provided between the beams 56, in order to be able to load the multiposition measuring arrangement; for example, with workpieces and to achieve an improved accessibility. The open space 63 is additionalLy necessary such that the extension arms of the measuring device can be moved without any obstructions. Finally, above the beams 56 there is also located the space 64 for the bridge 65.

Figure 7:
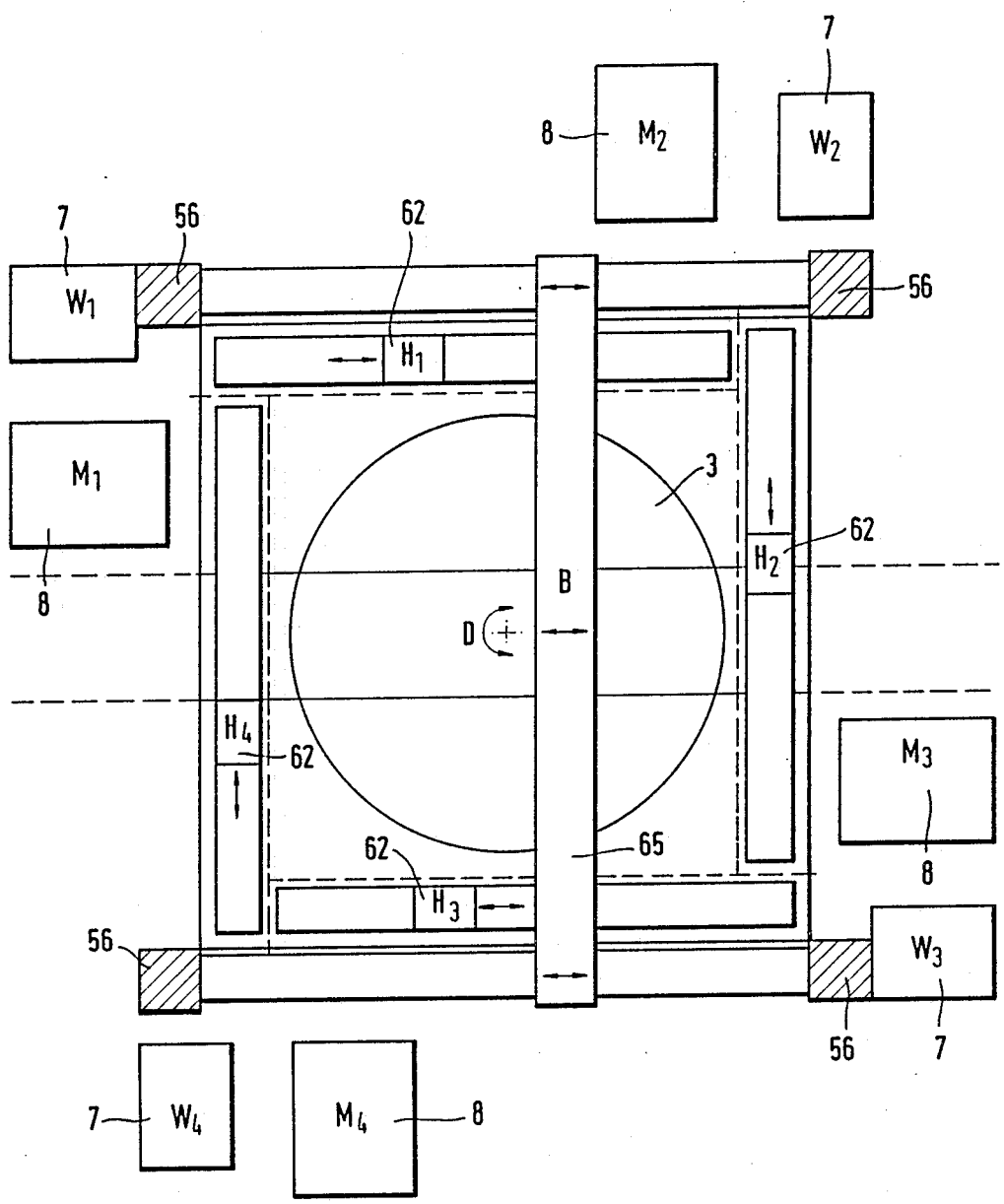
FIG. 7 illustrates a schematic representation of the principal assembly of the multiposition measuring system with the system components.

As also additionally shown in FIG. 7, the measuring table 2 is constructed as a turntable 3 with an angle measuring device.

Figure 8:
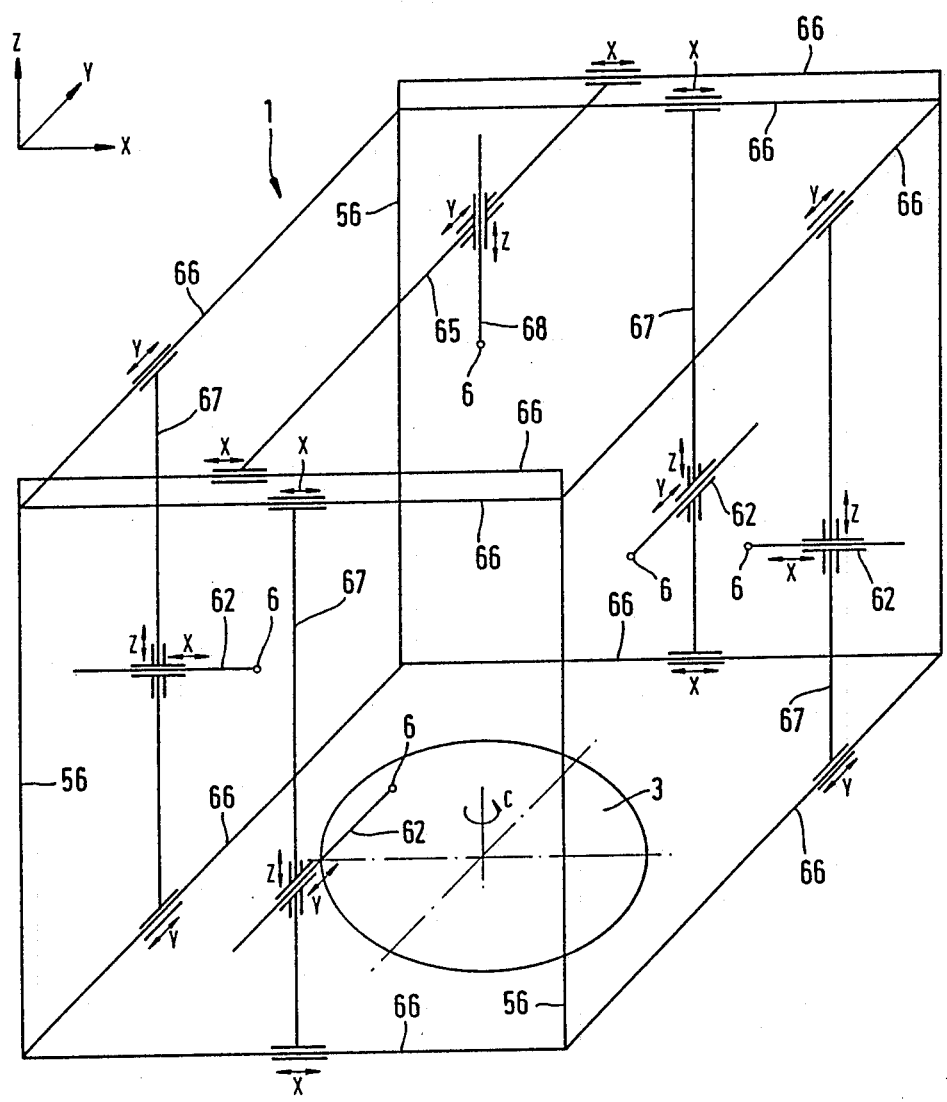
FIG. 8 illustrates a perspective view of a kinematic model of the multiposition measuring installation.
Figure 9:
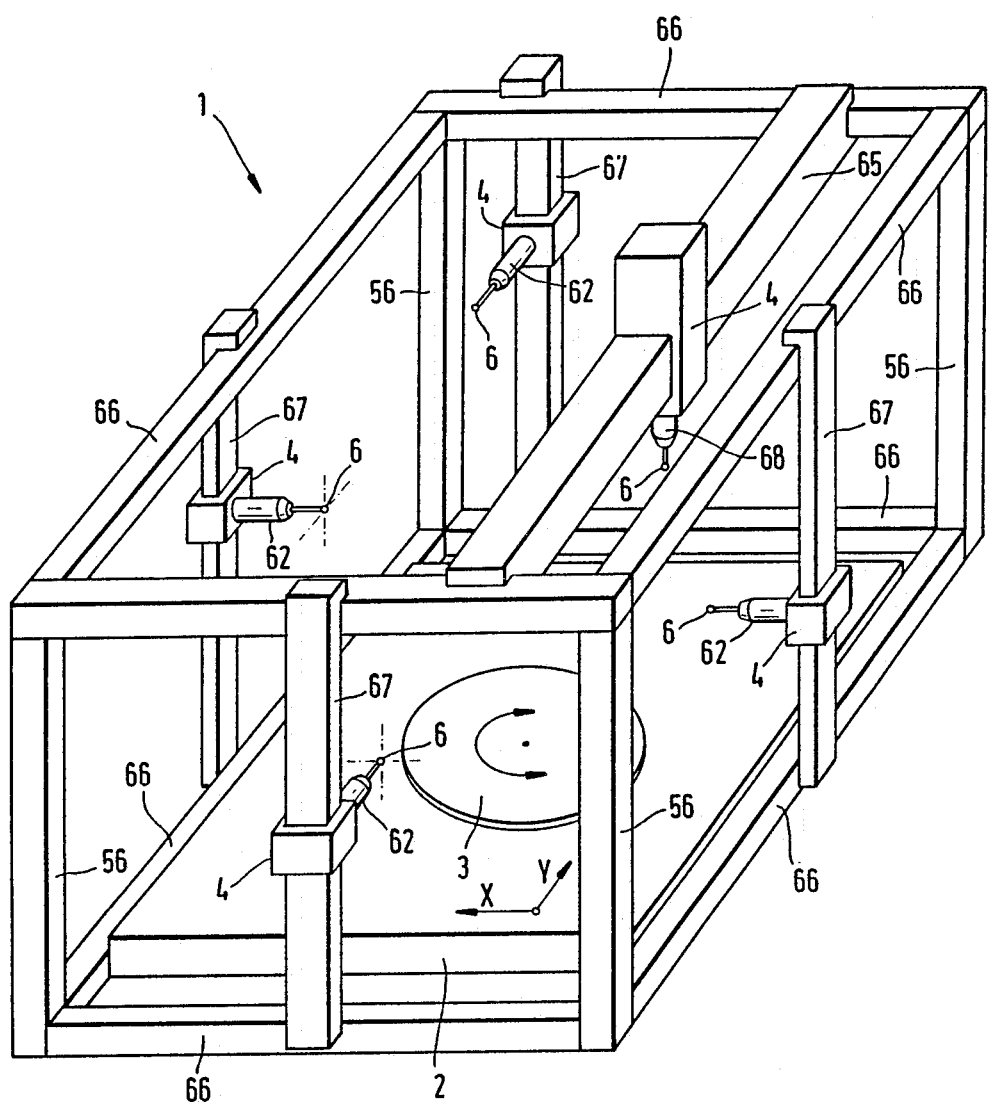
FIG. 9 illustrates a perspective view of the multiposition measuring installation of FIG. 8 with the base frame and suitable measuring devices.

FIG. 8 illustrates a kinematic model of the multiposition measuring installation 1, which is illustrated in FIG. 9 as an equipment or apparatus unit. Commencing from the corner columns 56 which are located in a rectangle, and which are arranged about the centrally-located turntable 3 with an angle measuring device, the multiposition measuring installation is constituted of a total of eleven horizontal displacement axles 66 to which there also belongs the bridge 65. Furthermore, there are provided four vertical displacement axles 67 and four horizontal extension arms 62, and one vertical spindle 68. Collective of the displacement axles are equipped with integrated linear measuring systems and inertial equilibrating or balancing devices. The eleven horizontal displacement axles 65 and, respectively, 66, allow for a movement of the measuring scanners or sensors 6 in the X- as well as in the Y-directions. The vertical displacement axles 67 afford the capability of the measuring sensor 6 being movable in a Z-direction. The same direction of movement in the Z-coordinate is effected through the vertical spindle 68. By means of the four horizontal extension arms 62 there again are provided movements of the measuring sensor 6 in the two coordinate directions X and Y.

Through the intermediary of this system, each measuring scanner or sensor 6 is displaceable in the three coordinate directions X, Y and Z independently of the remaining measuring sensors 6. The applicable displacement axles 66 and 67 are constructed in the form of rails which are connected with the corner columns 56. Thus, one vertical displacement axle 67 presently forms one vertical connection between two travel rails 66 located at the ends thereof. On this vertical connecting rail 67, the measuring device 4 is vertically displaceable, and presently possesses a horizontal extension arm in the form of a spindle sleeve which receives the measuring sensor 6. In conformance with the example in FIG. 7, the measuring sensors can be constructed as single as well as multiple sensors. The bridge 65 is displaceably guided in rails 66 along the upper displacement axles, wherein rails rest on the columns 56. On the bridge 65 the measuring device 4 is movable in the Y-direction, and in addition thereto, possesses the vertical spindle sleeve 68 with the measuring sensor 6. The measuring table 2 incorporates the integrated turntable 3 with an angle measuring device and, moreover, is moveable in the X and Y coordinate directions. A plurality of small turntables may be integrated in a large turntable or measuring table.

What is claimed is:

1. A multiposition measuring installation, comprising:
   a framework;
   a worktable located in said framework to support a workpiece;
   a plurality of measuring devices to measure a multitude of parameters of the workpiece and to generate signals indicating values for said measured parameters;
   support means connecting each of said measuring devices to the framework and supporting each of the measuring devices for movement therealong, each of said support means supporting each of the measuring devices for movement along the framework in two mutually orthogonal directions independent of all of the other of the measuring devices;
   each of said measuring devices including a body and a sensor to sense a parameter of the work piece, the sensor of each measuring device being connected to the body thereof for movement in a direction orthogonal to the two directions in which the support means supports the measuring device for movement; and
   evaluation means connected to the measuring devices to receive said signals therefrom and to evaluate said signals according to a predetermined program, and to compare at least selected signals to corresponding reference values.

2. A multiposition measuring installation according to claim 1, wherein:
   the support means supports each of the measuring devices for movement along the framework independently of all of the other of said measuring devices; and
   the installation further includes control means connected to the measuring devices to preclude any of the measuring devices from obstructing movement of any of the other measuring devices.

3. A multiposition measuring installation according to claim 2, wherein:
   the framework includes a plurality of vertical support columns;
   the work table is selected from the group consisting of a turn table, a switching plate and a stationary measuring table;
   the support means includes at least one bridge supported by the framework for movement thereacross, said bridge supporting one of the measuring devices;
   each of the measuring devices includes a sensor operatively mounted on the measuring device to sense a parameter of the workpiece; and
   the installation further comprises a primary computer, said primary computer including the evaluation means.

4. A multiposition measuring installation as claimed in claim 3, wherein each of said measuring devices is movable on two parallel horizontal displacement axles intermediate to adjoining columns, said device having a horizontal extension arm movable above a vertical connecting support along a vertical displacement axle and movable at right angles to the horizontal and vertical displacement axles, which receives the measuring sensor for the scanning of the measured object.

5. A multiposition measuring installation as claimed in claim 3, wherein said at least one bridge supports one of the measuring devices above said columns, said measuring device having a vertical spindle sleeve and is movable in conjunction with the bridge along mutually right-angled horizontal displacement axles, and which receives said respective measuring sensor for scanning along a measured object.

6. A multiposition measuring installation according to claim 3, further including:
   a measuring device interface means connected to the primary computer and to the measuring devices to transmit data between said measuring devices and the primary computer;
   a memory unit to store data, and storing said predetermined program and said reference values;
   a storage interface means connected to the primary computer and to the memory unit to transmit data therebetween; and
   a periphery bus system connected to the primary computer and including a terminal, a printer, a plotter, and a graphics art tray.

7. A multiposition measuring installation according to claim 3, wherein:
   the plurality of vertical support columns includes four columns spaced apart and defining a rectangle extending around the work table;
   the work table includes four sides;
   the plurality of measuring devices includes five measuring devices;
   a respective one of the measuring devices is located on each of the four sides of the work table, and the fifth measuring device is located above the work table;
   the installation forms respective side installing and open spaces on each of the four sides of the work table to facilitate movement and installation of the measuring devices on said four sides of the work table; and
   the installation further forms a top installing space above said four columns to facilitate movement and installation of said bridge.

8. A multiposition measuring installation according to claim 1, wherein movement of each of the measuring devices along the framework is CNC-controlled.

9. A multiposition measuring installation according to claim 1, wherein:
   the framework includes
   (i) first, second third and four the vertical columns,
   (ii) first, second third and fourth horizontal bottom beams connected to said first, second, third and fourth vertical columns and forming a bottom rectangle; and (iii) first, second, third and fourth horizontal top beams connected to said first, second, third and fourth horizontal columns and forming a top rectangle;

the support means includes (i) a first vertical beam extending between and supported by the first bottom beam and the first top beam for sliding movement therealong in a first direction, (ii) a second vertical beam extending between and supported by the second bottom beam and the second top beam for sliding movement therealong in a second direction, (iii) a third vertical beam extending betweeen and supported by the third bottom beam and the third top beam for sliding movement therealong in the first direction, (iv) a fourth vertical beam extending between and supported by the fourth bottom beam and the fourth top beam for sliding movement therealong in the second direction, and (v) a bridge extending between and supported by the first and third top beams for sliding movement therealong in the first direction;

the plurality of measuring devices includes first, second, third, fourth and fifth measuring devices;

the first measuring device is mounted on the first vertical beam for vertical sliding movement therealong in a third direction;

the second measuring device is mounted on the second vertical beam for vertical sliding movement therealong in the third direction;

the third measuring device is mounted on the third vertical beam for vertical sliding movement therealong in the third direction;

the fourth measuring device is mounted on the fourth vertical beam for vertical sliding movement therealong in the third direction;

the fifth measuring device is connected to the bridge for vertical sliding movement therealong in the second direction.

10. A multiposition measuring installation according to claim 9, wherein:

each of the measuring devices includes a body, a sensor to sense a parameter to the workpiece, and a spindle connecting the sensor to the body and supporting the sensor for movement toward and away from the body of the measuring device;

the spindle of the first measuring device supports the sensor thereof for movement in said second direction;

the spindle of the second measuring device supports the sensor thereof for movement in said first direction;

the spindle of the third measuring device supports the sensor thereof for movement in said second direction;

the spindle of the fourth measuring device supports the sensor thereof for movement in said first direction; and the spindle of the fifth measuring device supports the sensor thereof for movement in said third direction.

* * * * *

UNITED STATES PATENT AND TRADEMARK OFFICE
CERTIFICATE OF CORRECTION

PATENT NO. : 4,953,306

DATED : September 4, 1990

INVENTOR(S) : Albert Weckenmann, et al.

It is certified that error appears in the above-identified patent and that said Letters Patent is hereby corrected as shown below:

In the Abstract, line 7: "installation" should read as --installations--

Column 6, line 30: "additionalLy" should read as -- additionally--

Column 9, line 3, Claim 9: "horizontal" should read as --vertical--

Signed and Sealed this

Twenty-eighth Day of January, 1992

Attest:

HARRY F. MANBECK, JR.

*Attesting Officer*      *Commissioner of Patents and Trademarks*